US007358955B2

(12) United States Patent
Lim

(10) Patent No.: US 7,358,955 B2
(45) Date of Patent: Apr. 15, 2008

(54) LIQUID CRYSTAL DISPLAY FOR MOBILE PHONE

(75) Inventor: Joo Soo Lim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 459 days.

(21) Appl. No.: 10/683,282

(22) Filed: Oct. 14, 2003

(65) Prior Publication Data

US 2004/0150781 A1    Aug. 5, 2004

(30) Foreign Application Priority Data

Nov. 16, 2002   (KR) .................. 10-2002-0071380

(51) Int. Cl.
*G09G 3/36* (2006.01)
*G09G 5/00* (2006.01)
*G02F 1/1345* (2006.01)

(52) U.S. Cl. .................. 345/103; 345/96; 345/209; 349/148; 349/150; 349/152; 438/129

(58) Field of Classification Search ............... 345/87, 345/92, 93, 96, 103, 104, 205; 349/148, 349/150, 151, 141
See application file for complete search history.

(56) References Cited

U.S. PATENT DOCUMENTS

| 6,243,062 | B1 * | 6/2001 | den Boer et al. ............. 345/91 |
| 6,262,702 | B1 * | 7/2001 | Murade ....................... 345/87 |
| 6,469,684 | B1 * | 10/2002 | Cole ........................... 345/58 |
| 6,522,369 | B2 * | 2/2003 | Ohta et al. .................... 349/39 |
| 6,665,037 | B2 * | 12/2003 | Hagiwara .................... 349/148 |
| 6,784,966 | B2 * | 8/2004 | Maeda et al. ............... 349/141 |
| 6,853,361 | B2 * | 2/2005 | Tsuyuki et al. ............... 345/92 |
| 6,940,484 | B2 * | 9/2005 | Yatabe ........................ 345/99 |
| 7,015,886 | B2 * | 3/2006 | Matsuyama .................. 345/87 |

* cited by examiner

*Primary Examiner*—Henry N Tran
(74) *Attorney, Agent, or Firm*—McKenna Long & Aldridge LLP

(57) ABSTRACT

There is disclosed a liquid crystal display for a mobile phone that is adaptive for minimizing horizontal flicker. A liquid crystal display for a mobile phone according to an embodiment of the present invention includes a liquid crystal display panel where liquid crystal cells are each arranged in a matrix at each intersection part of data lines and gate lines; and a driver supplying a data signal to the data line and, in addition, supplying a gate signal to the adjacent gate lines in a different direction from each other.

9 Claims, 8 Drawing Sheets ns to the first to $(n/2)^{th}$ gate lines GL
LIQUID CRYSTAL DISPLAY FOR MOBILE PHONE The present invention claims the benefit of Korean Patent Application No. 2002-71380, filed on Nov. 16, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display for a mobile phone that is adaptive for minimizing horizontal flicker.

2. Description of the Related Art

Generally, liquid crystal displays control the light transmittance of liquid crystals through the use of electric fields, thereby displaying pictures. To this end, the liquid crystal display includes a liquid crystal display panel where liquid crystal cells are arranged in a matrix, and a drive circuit to drive the liquid crystal display panel. Such liquid crystal displays have been commercialized as portable televisions or as display devices of lap-top computers, etc., because they can be made smaller than cathode ray tube (CRT) displays.

Referring to FIG. 1, a mobile phone using a liquid crystal display of the related art includes a liquid crystal display panel 30 and a drive circuit to drive the liquid crystal display panel 30.

The liquid crystal display panel 30 includes liquid crystal cells arranged in a matrix between upper and lower substrates 10 and 20 having thin film transistors (TFT) for switching based on signals supplied to each liquid crystal cell. The thin film transistor is installed at a crossing of gate lines GL and data lines DL for switching data signals in response to scan signals, i.e., gate signals, from the gate line GL, wherein the data signal is to be transmitted to the liquid crystal cell. The liquid crystal display panel 30 is divided into a display part 21 provided with the liquid crystal cells, and a non-display part provided with signal lines for driving the liquid crystal cells.

In the non-display part of the liquid crystal display, there are formed first signal lines 22 formed on one side of the liquid crystal display panel 30 for supplying drive signals to first to $(n/2)^{th}$ gate lines GL, second signal lines 23 formed on the other side of the liquid crystal display panel 30 for supplying drive signals to $((n/2)+1)^{th}$ to $n^{th}$ gate lines GL, and third signal lines 24 to supply drive signals to the data lines DL.

Further, in the lower part of the non-display part, there are formed first gate pads 32A connected to the first signal lines 22 respectively, data pads 38 connected to the third signal lines 24 respectively, and second gate pads 32B connected to the second signal lines 23 respectively.

A chip-on-film 55 (hereinafter, referred to as COF) is connected to the lower part of the non-display part by a tape-automated-bonding TAB method, wherein the COF has drive circuits mounted thereon to drive the liquid crystal display panel 30. A gate drive integrated circuit 40 for driving the gate lines GL, and a data drive integrated circuit 50 for driving the data lines DL are mounted on the COF 55. On the COF 55, output pads are formed to be connected to the data pads 38 and the first and second gate pads 32A and 32B, and COF signal lines are formed connecting the output pads with the output terminals of the gate drive integrated circuit 40 and the output terminals of the data drive integrated circuit 50, respectively.

The gate drive integrated circuit 40 sequentially supplies scan signals to the gate lines GL in response to control signals from a timing controller, thereby sequentially driving the liquid crystal cells on the liquid crystal display panel 30 by lines. In other words, the gate drive integrated circuit 40 supplies the scan signals to the first to $(n/2)^{th}$ gate lines GL using the first gate signal lines 22 and, in addition, supplies the scan signals to the $((n/2)+1)^{th}$ to $n^{th}$ gate lines GL using the second gate signal lines 23. In other words, the gate drive integrated circuit 40 supplies the scan signals to flow from left to right in the liquid crystal display panel 30 using the first signal lines 22, and supplies the scan signals to flow from right to left in the liquid crystal display panel 30 using the second signal lines 23.

The data drive integrated circuit 50 supplies pixel voltage signals to each data line DL whenever the scan signal is supplied to any one of the gate lines GL. Accordingly, the liquid crystal display panel 30 controls the light transmittance by the electric field applied between a pixel electrode and a common electrode in accordance with the pixel voltage signal by liquid crystal cells, thereby displaying pictures.

The liquid crystal cells LC on the liquid crystal display panel 30 are driven by a line inversion method in the liquid crystal display for the mobile phone. In a driving method of the liquid crystal display panel, the polarity of the data signals is inverted along the horizontal line, i.e., gate line, on the liquid crystal display panel 30 in the line inversion method.

In the liquid crystal display for the mobile phone driven by the line inversion method, as described above, horizontal flicker are generated due to the polarity difference of the data signals, i.e., the brightness difference and the visual sensation characteristics difference between a positive (+) line and a negative (−) line, because the gate lines GL of the liquid crystal display panel 30 are divided into the first to $(n/2)^{th}$ gate lines GL and the $((n/2)+1)^{th}$ to $n^{th}$ gate lines GL to be supplied with the scan signals. In other words, the horizontal flickers 80 are generated in the liquid crystal display panel 30, as in FIG. 3, because there occurs a deviation of effective voltage between the common voltage Vcom and the positive (+) and negative (−) voltages of the data signal, as shown in FIG. 2, due to the line resistance of the gate lines GL. Accordingly, picture quality deteriorates due to the foregoing horizontal flickers 80 in the liquid crystal display for the mobile phone of the related art.

In this way, the horizontal flicker generated in the liquid crystal display panel of the liquid crystal display for the mobile phone according to the driving method by the line inversion method are generated when a frame frequency is below 60 Hz, so the horizontal flicker can be improved if the display is driven with the frame frequency above 120 Hz. However, if it is driven with the frame frequency above 120 Hz, there is a disadvantage in that the power consumption of the display increases.

Further, in the liquid crystal display for the mobile phone of the related art, as shown in FIG. 4, the horizontal flickers are generated on the liquid crystal display panel 30 by the capacitance Cpp in accordance with the distance (W) between the liquid crystal cell and the adjacent liquid crystal cells to its top and bottom. In other words, as the capacitance Cpp increases in accordance with the distance (W) between the liquid crystal cells, the voltage difference between horizontal lines also increases, thereby generating the horizontal flickers.

On the other hand, in the liquid crystal display for the mobile phone of the related art, as shown in FIG. 5, the horizontal flickers are generated on the liquid crystal display panel 30 in accordance with the line resistance difference between an input bumper 42 of the gate drive integrated circuit 40 mounted on the COF 55 and the pad of an interface 72 that supplies the drive signal to the gate drive integrated circuit 40.

To be more specific, the drive signal from the pad of the interface 72 is applied to the liquid crystal display panel 30 through the COF 55. In other words, the input bumper 42 of the gate drive integrated circuit 40 is connected to the pad of the interface 72 by a COF signal line 70 on the COF 55. The input bumper 42 of the gate drive integrated circuit 40 receives the drive signal from any one of the pads of the interfaces 72 to drive the gate lines GL. At this moment, as the difference in line resistance of the COF signal line 70 on the COF 55 increases, the voltage difference of the drive signal inputted to the input bumper 42 of the gate drive integrated circuit 40 increases, thereby generating the horizontal flickers due to the polarity difference of the data signals, i.e., the brightness difference and the visual sensation characteristics difference between the positive (+) and negative (−) lines as applied to the liquid crystal cell.

SUMMARY OF THE INVENTION

Accordingly, the present invention is directed to a liquid crystal display for a mobile phone that substantially obviates one or more of the problems due to limitations and disadvantages of the related art.

It is an advantage of the present invention to provide a liquid crystal display for a mobile phone that is adaptive so as to minimize horizontal flicker.

An advantage of the present invention is to provide a liquid crystal display for a mobile phone according to an aspect of the present invention including a liquid crystal display panel where liquid crystal cells are each arranged in a matrix at each crossing of data lines and gate lines; and a driver supplying a data signal to the data line and, in addition, supplying gate signals to the adjacent gate lines in different directions from each other.

Another advantage of the present invention is to provide the liquid crystal display panel including a first signal line formed on one side of the liquid crystal display panel connected to an odd-numbered gate line; a second signal line formed on the other side of the liquid crystal display panel connected to an even-numbered gate line; and a third signal line connected to the data line.

Another advantage of the present invention is to provide a driver that includes a film adhered to the liquid crystal display panel; a data drive circuit mounted on the film for supplying a data signal to the third signal line; and a gate drive circuit mounted on the film for supplying a gate signal to the first and second signal lines.

Another advantage of the present invention is to provide a distance between a pixel electrode of the liquid crystal cell and a pixel electrode of the adjacent liquid crystal cell is at 0.7 μm.

Another advantage of the present invention is to provide a driver that includes signal lines commonly connected to at least two input terminals and dummy input terminals.

Another advantage of the present invention is to provide a resistance of the signal line below about 10Ω.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a method of driving a liquid crystal display (LCD) device having gate lines and data lines is provided. This method includes supplying data signals to data lines and gate signals to gate lines from the same driver; and supplying said gate signals to said gate lines such that gate signals of adjacent gate lines have opposite directions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
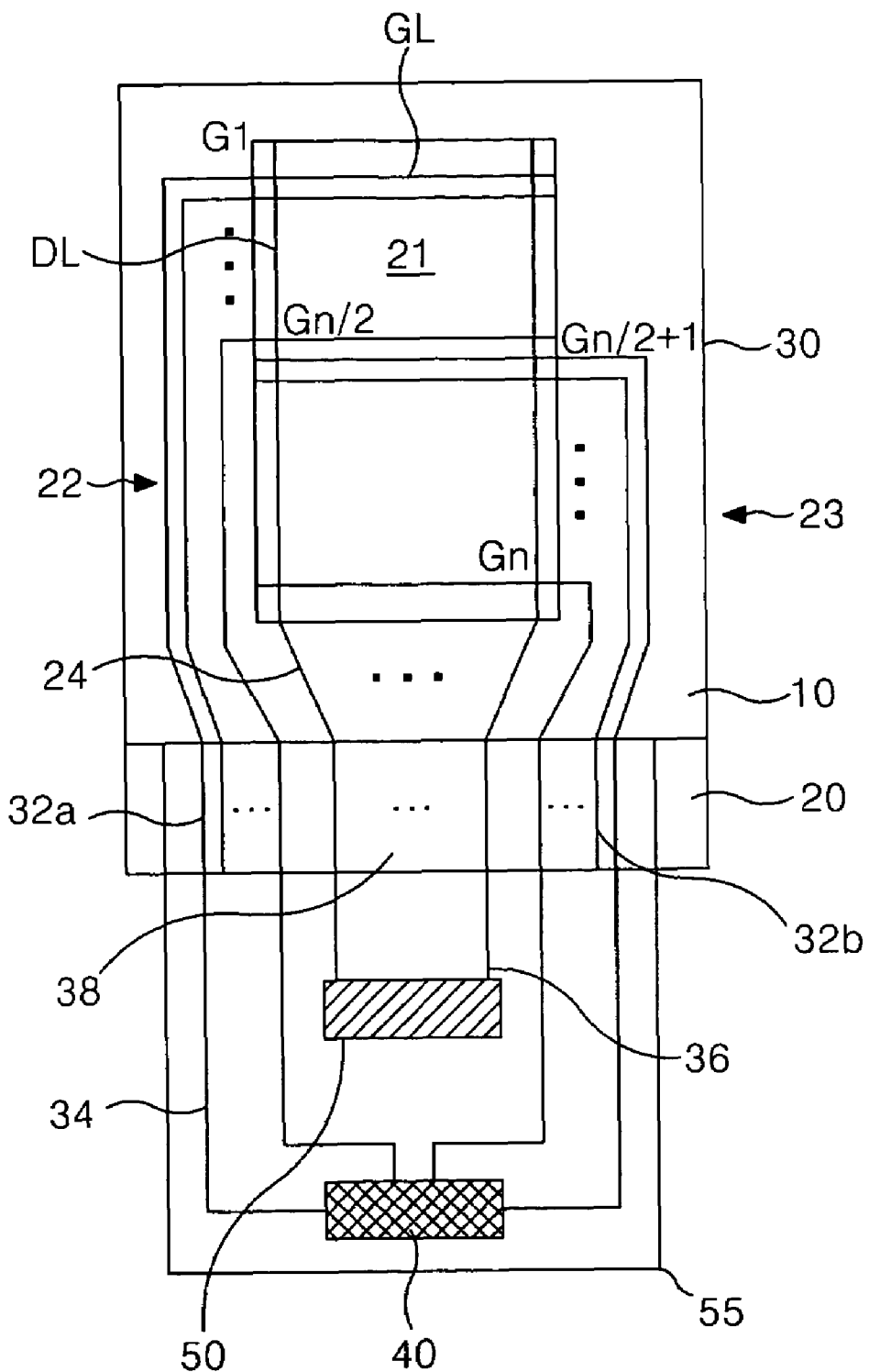
FIG. 1 is a diagram representing a related art liquid crystal display for a mobile phone.
Figure 2:
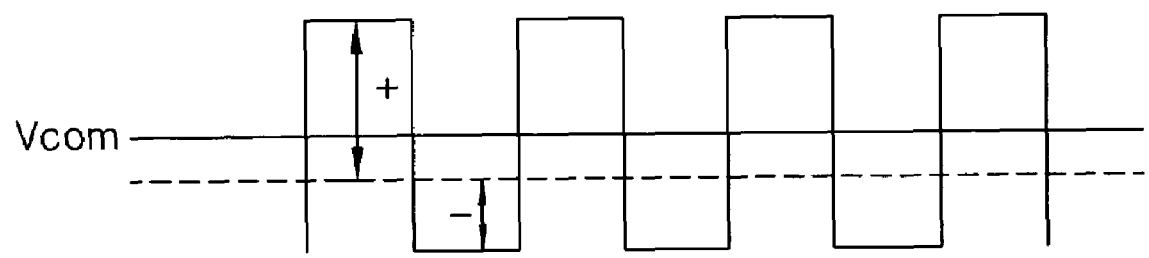
FIG. 2 is a waveform diagram representing the polarity of a data signal supplied to a liquid crystal display panel shown in FIG. 1.
Figure 3:
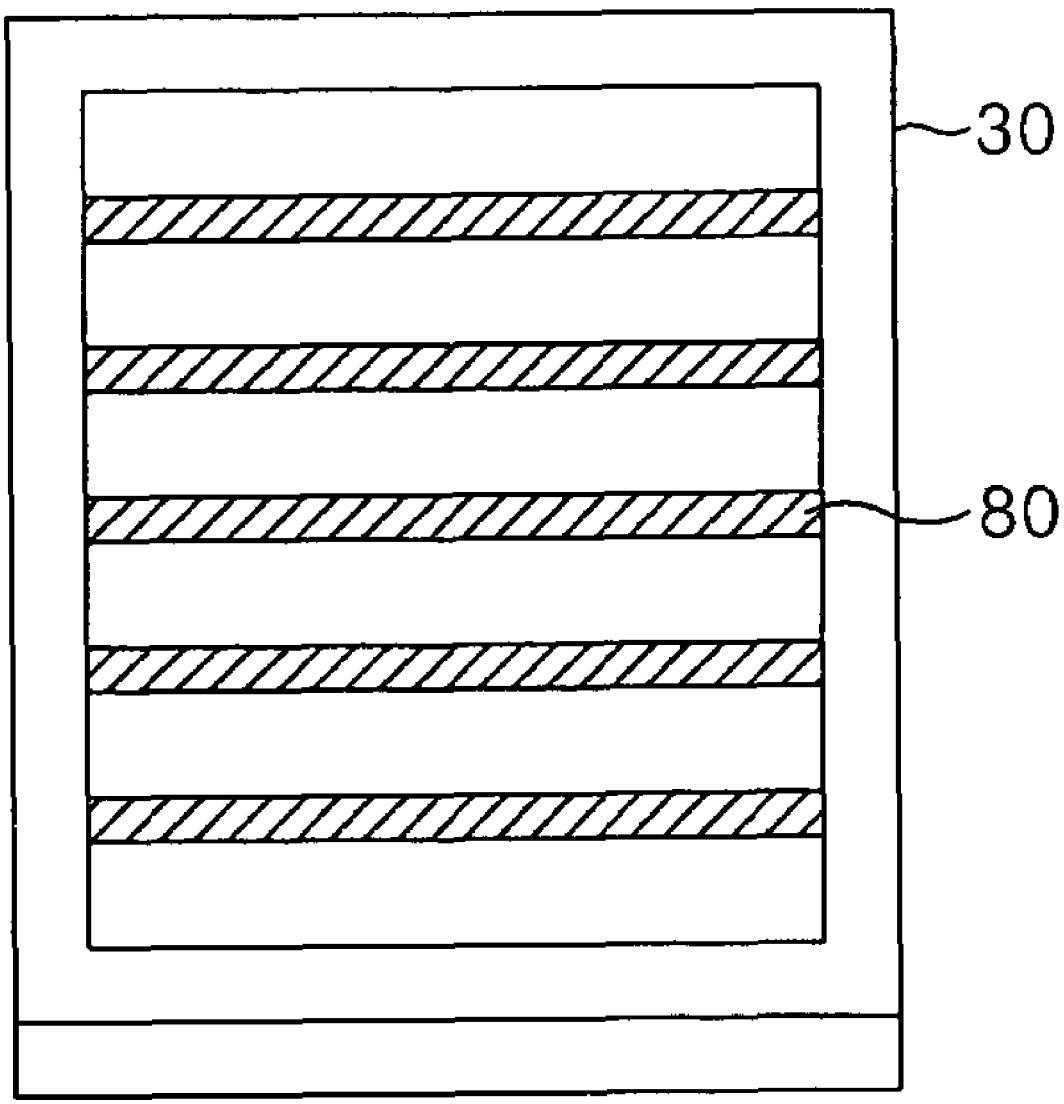
FIG. 3 is a diagram representing horizontal flicker generated in the related art mobile phone.
Figure 4:
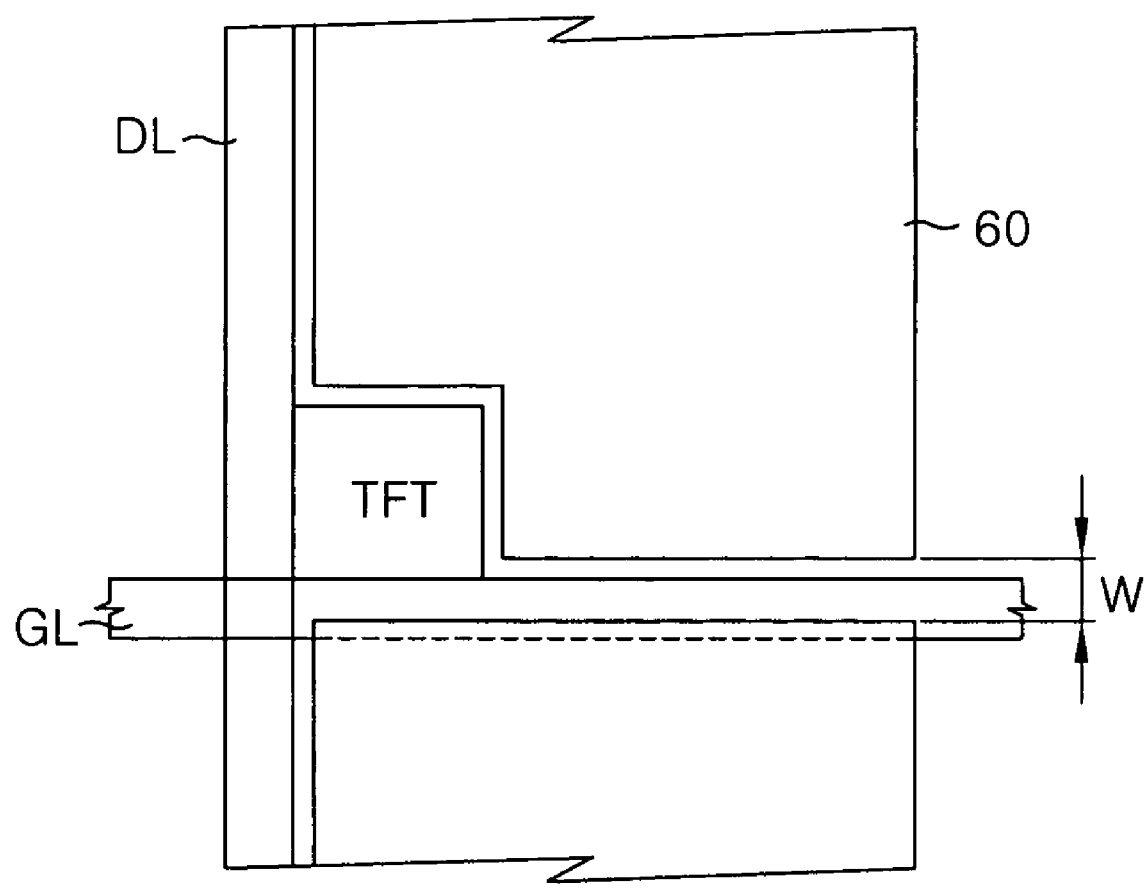
FIG. 4 is a diagram representing a distance between adjacent cells in the liquid crystal display panel shown in FIG. 1.
Figure 5:
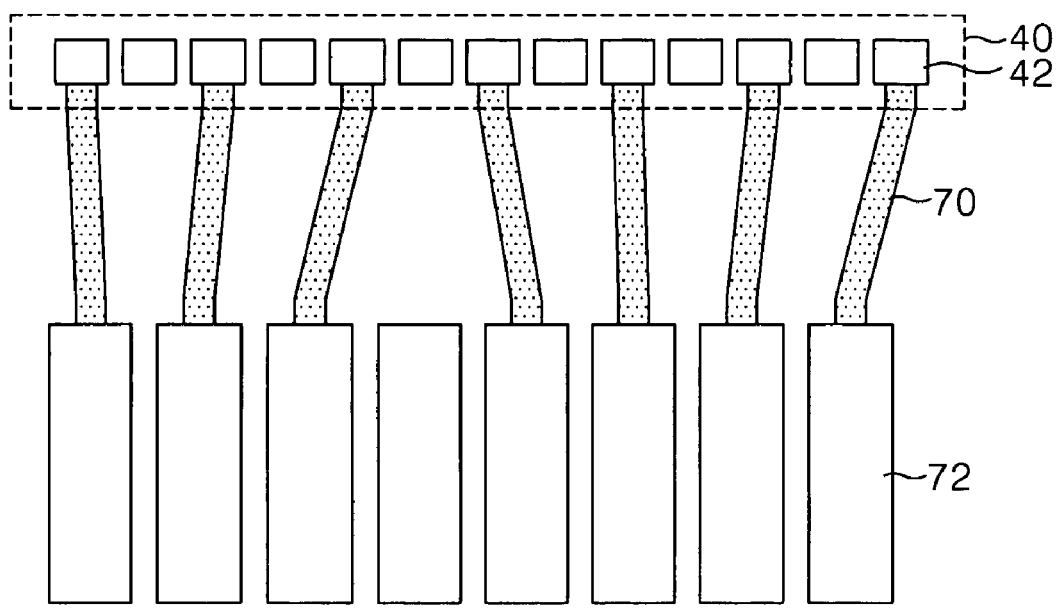
FIG. 5 is a diagram representing a signal line on a COF shown in FIG. 1.
Figure 6:
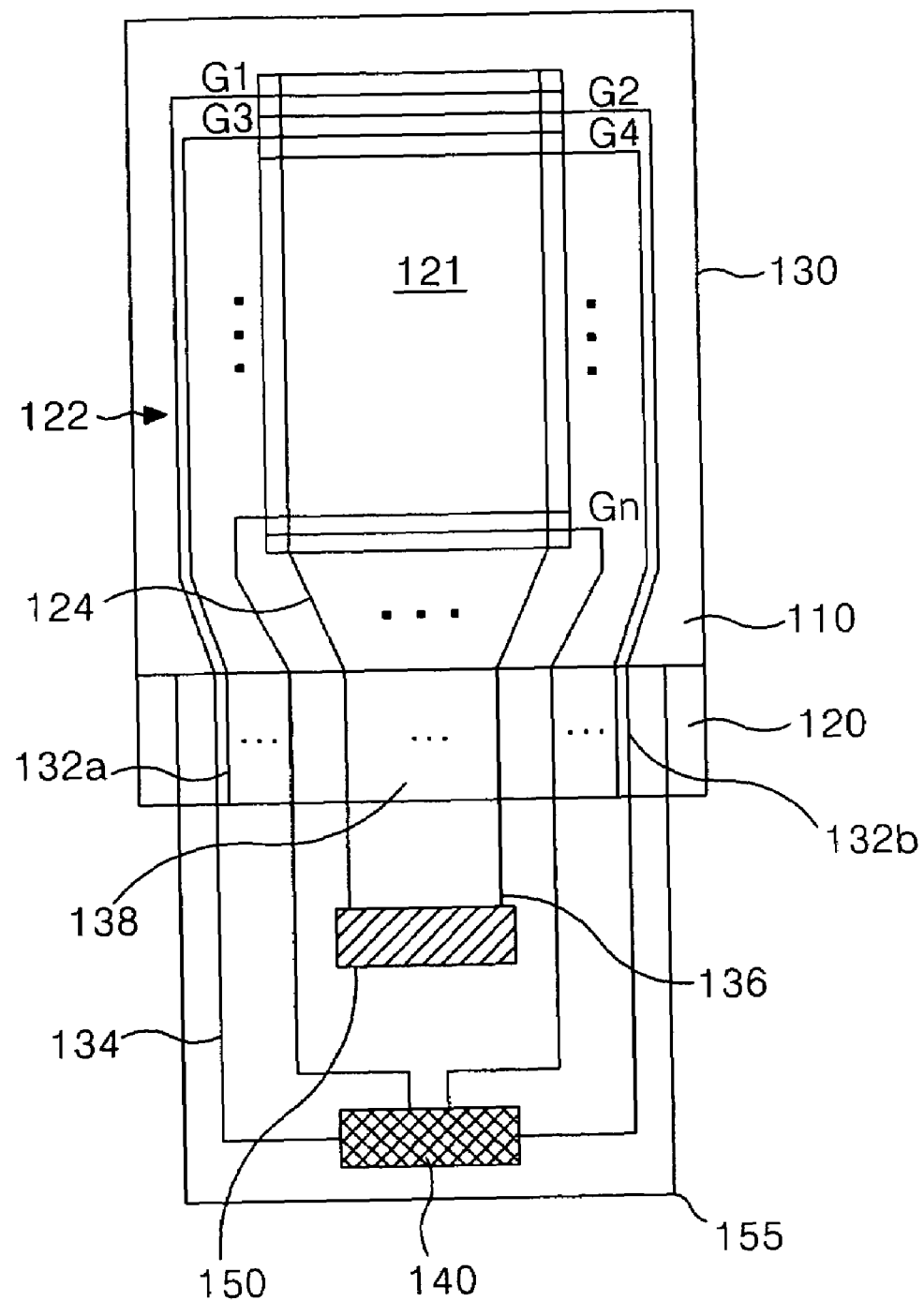
FIG. 6 is a diagram representing a liquid crystal display for a mobile phone according to a first embodiment of the present invention.

FIG. 6 is a diagram representing a liquid crystal display for a mobile phone according to a first embodiment of the present invention.

Referring to FIG. 6, the liquid crystal display for the mobile phone according to the first embodiment of the present invention includes a liquid crystal display panel 130 and a drive circuit to drive the liquid crystal display panel 130.

The liquid crystal display panel 130 includes liquid crystal cells arranged in a matrix between upper and lower substrates 110 and 120, and thin film transistors (TFT) in each cell to switch signals supplied to the liquid crystal cell. The thin film transistor is installed at each crossing of gate lines GL and data lines DL for switching data signals in response to scan signals, i.e., gate signals, from the gate line GL, wherein the data signal is to be transmitted to the liquid crystal cell. The liquid crystal display panel 130 is divided into a display part 121 provided with the liquid crystal cells, and a non-display part provided with signal lines that is for driving the liquid crystal cells.

In the non-display part of the liquid crystal display, there are formed first signal lines 122 formed on one side of the liquid crystal display panel 130 for supplying drive signals to odd-numbered gate lines GL, second signal lines 123 formed on the other side of the liquid crystal display panel 130 for supplying drive signals to even-numbered gate lines GL, and third signal lines 124 to supply drive signals to the data lines DL.

Further, in the lower part of the non-display part, there are formed first gate pads 132a connected to the first signal lines 122 respectively, data pads 138 connected to the third signal lines 124 respectively, and second gate pads 132b connected to the second signal lines 123 respectively.

A chip-on-film 155 (hereinafter, referred to as COF) is connected to the lower part of the non-display part by a tape-automated-bonding TAB method, wherein the COF has the drive circuits mounted thereon to drive the liquid crystal display panel 130. A gate drive integrated circuit 140 for driving the gate lines GL and a data drive integrated circuit 150 for driving the data lines DL are mounted on the COF 155. On the COF 155, output pads are formed to be connected to the data pads 138 and the first and second gate pads 132a and 132b of the liquid crystal display panel 130, and COF signal lines are formed connecting the output pads with the output terminals of the gate drive integrated circuit 140 and the output terminals of the data drive integrated circuit 150, respectively.

The gate drive integrated circuit 140 sequentially supplies scan signals to the gate lines GL in response to control of a timing controller, thereby sequentially driving the liquid crystal cells on the liquid crystal display panel 130 by lines. In other words, the gate drive integrated circuit 140 supplies the scan signals to the odd-numbered gate lines GL using the first gate signal lines 122 and, in addition, supplies the scan signals to the even-numbered gate lines GL using the second gate signal lines 123. In other words, the gate drive integrated circuit 140 alternately supplies the scan signals to the liquid crystal display panel 130 using the first and second signal lines 122 and 123. In this way, the scan signals are alternately applied, thus the length of the first and second signal lines 122 and 123 connected to the gate lines GL adjacent thereto on their top and bottom becomes similar.

The data drive integrated circuit 150 supplies pixel voltage signals to each data line DL whenever the scan signal is supplied to any one of the gate lines GL. Accordingly, the liquid crystal display panel 130 controls the light transmittance by the electric field applied between a pixel electrode and a common electrode in accordance with the pixel voltage signal by liquid crystal cells, thereby displaying pictures.

The liquid crystal cells LC on the liquid crystal display panel 130 are driven by a line inversion method. In a driving method of the liquid crystal display panel 130, the polarity of the data signals is inverted along the line, i.e., gate line, of the liquid crystal display panel 130 in the line inversion method.

In the liquid crystal display for a mobile phone driven by the line inversion method, as described above, the scan signals are supplied from left to right in case of the odd-numbered gate lines GL of the liquid crystal display panel 130, and are supplied from right to left in case of the even-numbered gate lines GL. Since the scan signals are alternately supplied to the liquid crystal display panel 130 in this way, it becomes possible to minimize the deviation of effective voltage between the common voltage Vcom and the positive (+) and negative (−) voltages of the data signals as driven by the line inversion method. Accordingly, the liquid crystal display for a mobile phone according to the first embodiment of the present invention can minimize horizontal flicker.

Figure 7:
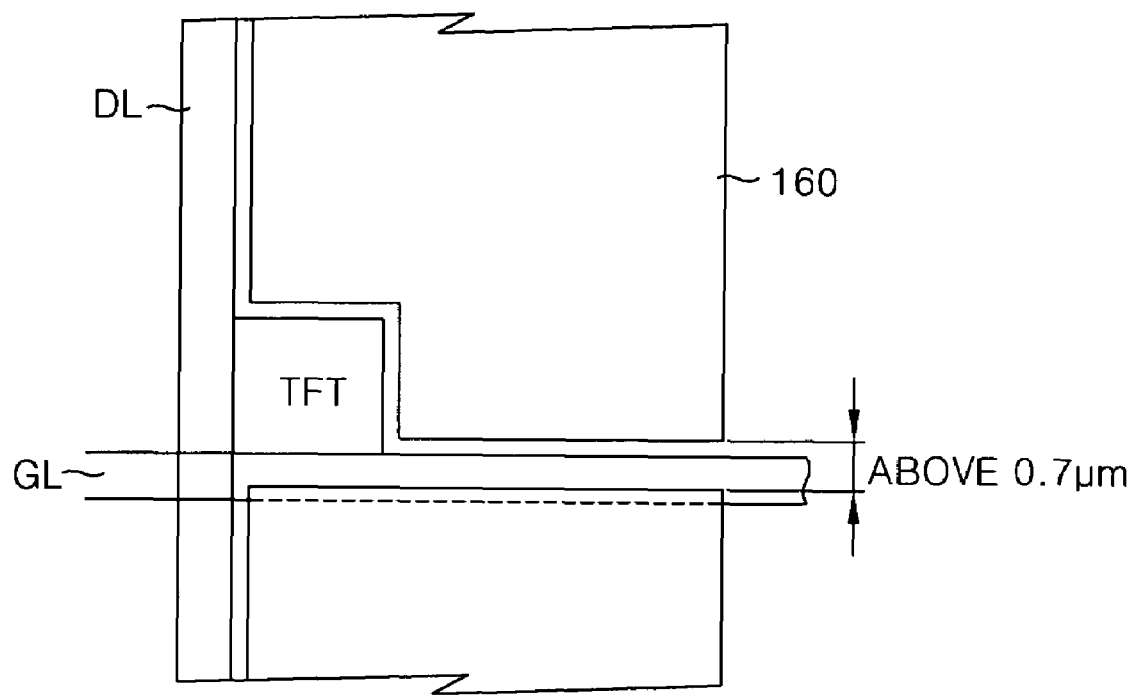
FIG. 7 is a diagram representing a distance between adjacent pixels according to a second embodiment of the present invention.

The liquid crystal display for a mobile phone according to a second embodiment of the present invention will be described as follows in conjunction with FIGS. 6 and 7. The liquid crystal display for the mobile phone according to the second embodiment of the present invention alternately supplies the scan signals to the liquid crystal display panel 130 and, in addition, minimizes the capacitance Cpp between the liquid crystal cells, thereby minimizing horizontal flicker.

To make this more specific, in the liquid crystal display for a mobile phone according to the second embodiment of the present invention, as shown in FIG. 6, first, the liquid crystal panel 130 includes the liquid crystal cells arranged in a matrix between upper and lower substrates 110 and 120, and thin film transistors TFT in each cell for switching the signals applied to the liquid crystal cells. The thin film transistor is installed at each crossing of the gate lines GL and the data line DL to switch the data signals toward the liquid crystal cell in response to the scan signals, i.e., gate pulse, from the gate line GL. The liquid crystal display panel 130 is divided into a display part 121 provided with the liquid crystal cells, and a non-display part provided with signal lines for driving the liquid crystal cells.

In the non-display part of the liquid crystal display panel 130, there are formed first signal lines 122 formed on one side of the liquid crystal display panel 130 for supplying drive signals to the odd-numbered gate lines GL, second signal lines 123 formed on the other side of the liquid crystal display panel 130 for supplying drive signals to the even-numbered gate lines GL, and third signal lines 124 to supply drive signals to the data lines DL.

Accordingly, in the liquid crystal display for a mobile phone using the liquid crystal display panel according to the second embodiment of the present invention, which is driven by the line inversion method, as described above, the scan signals are supplied from left to right in the liquid crystal display panel in case of the odd-numbered gate lines GL of the liquid crystal display panel 130 and are supplied from right to left in case of the even-numbered gate lines GL. Since the scan signals are alternately supplied to the liquid crystal display panel 130 in this way, it becomes possible to minimize the deviation of effective voltage between the common voltage Vcom and the positive (+) and negative (−) voltages of the data signals as driven by the line inversion method. Accordingly, the liquid crystal display for the mobile phone according to the second embodiment of the present invention can minimize horizontal flicker.

Further, in the liquid crystal display panel 130 of the liquid crystal display for the mobile phone according to the second embodiment of the present invention, the capacitance Cpp between pixels can be designed as low as possible because it depends on the distance between the adjacent pixels. However, the aperture ratio decreases if the capacitance Cpp between pixels is designed too distant, thus the distance between the adjacent pixels is formed to be at least 0.7 μm, as shown in FIG. 7.

Accordingly, the capacitance Cpp between the adjacent pixels is minimized, and the deviation of effective voltage between horizontal lines is minimized in the line inversion driving method where the data signal with a different polarity is supplied, thereby minimizing the horizontal flicker.

Figure 8:
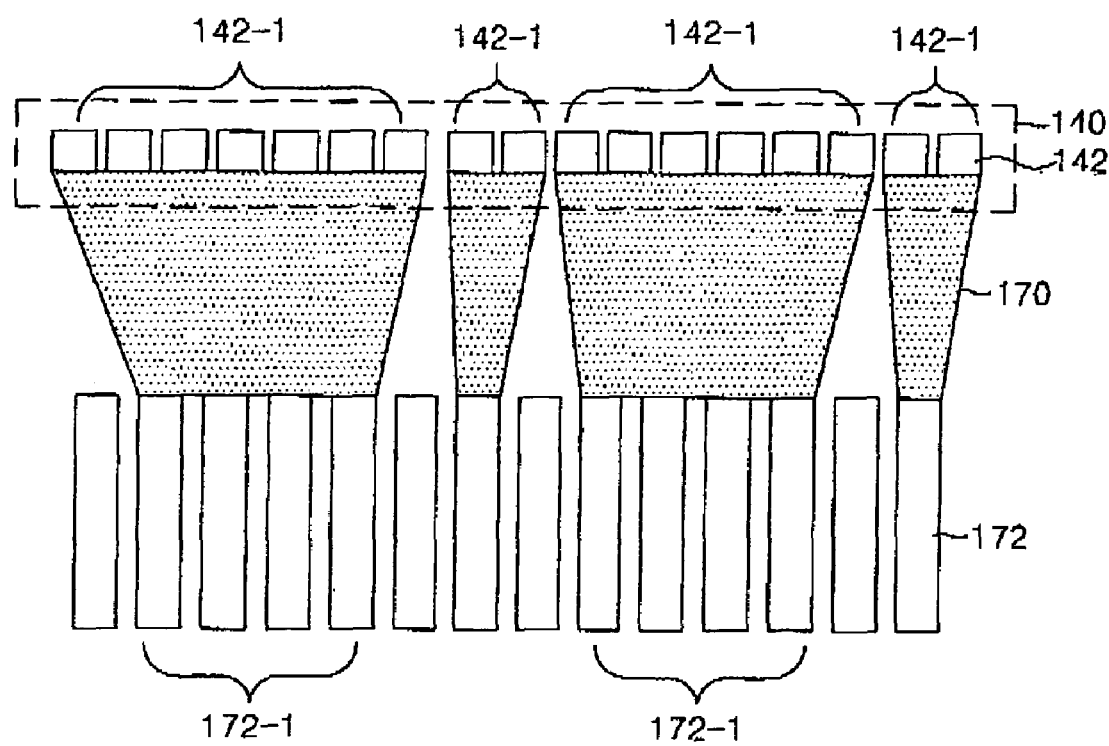
FIG. 8 is a diagram representing a signal line on a COF shown in FIG. 6.

The liquid crystal display for a mobile phone according to a third embodiment of the present invention will be described as follows in conjunction with FIGS. 6 and 8. The liquid crystal display for the mobile phone according to the third embodiment of the present invention alternately supplies the scan signals to the liquid crystal display panel 130 and, in addition, minimizes the line resistance between interface pads 172 and an input bumper 142 of the drive integrated circuit 140 mounted on a COF 155.

To make this more specific, in the liquid crystal display for a mobile phone according to the third embodiment of the present invention, as shown in FIG. 6, first, the liquid crystal panel 130 includes liquid crystal cells arranged in a matrix between upper and lower substrates 110 and 120, and thin film transistors TFT in each cell for switching the signals applied to the liquid crystal cells. The thin film transistor is installed at each crossing of the gate lines GL and the data line DL to switch the data signals toward the liquid crystal cell in response to the scan signals, i.e., gate pulse, from the gate line GL. The liquid crystal display panel 130 is divided into a display part 121 provided with the liquid crystal cells, and a non-display part provided with signal lines that is for driving the liquid crystal cells.

In the non-display part of the liquid crystal display panel 130, there are formed first signal lines 122 formed on one side of the liquid crystal display panel 130 for supplying drive signals to the odd-numbered gate lines GL, second signal lines 123 formed on the other side of the liquid crystal display panel 130 for supplying drive signals to the even-numbered gate lines GL, and third signal lines 124 to supply drive signals to the data lines DL.

In the lower part of the non-display part, a COF 155 is connected to the lower part of the non-display part by a TAB method, wherein the COF has the drive circuits mounted thereon to drive the liquid crystal display panel 130. A gate drive integrated circuit 140 for driving the gate lines GL and a data drive integrated circuit 150 for driving the data lines DL are mounted on the COF 155. On the COF 155, output pads are formed to be connected to the data pads 138 and the first and second gate pads 132a and 132b of the liquid crystal display panel 130, and COF signal lines are formed connecting the output pads with the output terminals of the gate drive integrated circuit 140 and the output terminals of the data drive integrated circuit 150, respectively.

The gate drive integrated circuit 140 sequentially supplies scan signals to the gate lines GL in response to a timing controller, thereby sequentially driving the liquid crystal cells on the liquid crystal display panel 130 by lines. In other words, the gate drive integrated circuit 140 supplies the scan signals to the odd-numbered gate lines GL using the first gate signal lines 122 and, in addition, supplies the scan signals to the even-numbered gate lines GL using the second gate signal lines 123. In other words, the gate drive integrated circuit 140 alternately supplies the scan signals to the liquid crystal display panel 130 using the first and second signal lines 122 and 123. In this way, the scan signals are alternately applied, thus the length of the first and second signal lines 122 and 123 connected to the gate lines GL adjacent thereto on their top and bottom becomes similar.

The data drive integrated circuit 150 supplies pixel voltage signals to each data line DL whenever the scan signal is supplied to any one of the gate lines GL. Accordingly, the liquid crystal display panel 130 controls the light transmittance by the electric field applied between a pixel electrode and a common electrode in accordance with the pixel voltage signal by liquid crystal cells, thereby displaying pictures.

Furthermore, the line resistance difference is minimized between the pads 172 of the interface and the input bumper 142 of the gate drive integrated circuit 140 mounted on the COF 155.

To this end, the COF signal line 170 on the COF 155 is commonly connected to the pads 172 of the interface and the input bumpers 142 of the gate drive integrated circuit 140. At this moment, the same drive signal is applied or dummy input bumpers 142-1 and the dummy pads 172-1 of the interface, to which no drive signal is applied, are commonly connected, so as to make the resistance of the signal line 170 below about 10Ω. Accordingly, the line resistance of the COF signal line 170 decreases according to the following Formula 1.

$$R=\rho(L/A).$$ [Formula 1]

In Formula 1, R represents the line resistance of the COF signal line 170, ρ is a constant, A is the area of the COF signal line 170, and L is the length of the COF signal line 170. The line resistance of the signal line 170 decreases because the area (A) of the COF signal line 170 increases, wherein the COF signal line 170 is commonly connected to the input bumpers 142 and the pads 172 of the interface as in Formula 1.

Accordingly, in the liquid crystal display for a mobile phone according to the third embodiment of the present invention, which is driven by the line inversion method, as described above, the scan signals are supplied from left to right in the liquid crystal display panel in case of the odd-numbered gate lines GL of the liquid crystal display panel 130 and are supplied from right to left in case of the even-numbered gate lines GL. Since the scan signals are alternately supplied to the liquid crystal display panel 130 in this way, it becomes possible to minimize the deviation of effective voltage between the common voltage Vcom and the positive (+) and negative (−) voltages of the data signals as driven by the line inversion method. Accordingly, the liquid crystal display for the mobile phone according to the third embodiment of the present invention can minimize horizontal flicker.

Further, the liquid crystal display for a mobile phone according to the embodiment of the present invention has a line resistance below about 10Ω, which line resistance is formed between the input bumpers 142 of the gate drive integrated circuit 140 and the pads 172 of the interface supplying the drive signal to the input bumpers 142. This minimizes the horizontal flicker due to the polarity difference of the data signals, i.e., the brightness difference and the visual sensation characteristics difference between a positive (+) line and a negative (−) line, supplied to the pixel.

As described above, the liquid crystal display for a mobile phone according to the embodiment of the present invention alternately supplies the scan signals to the liquid crystal display panel. Further this invention alternately supplies the scan signals to the liquid crystal display panel and, in addition, has the distance between the adjacent liquid crystal cells above 0.7 μm. Further, this invention alternately supplies the scan signals to the liquid crystal display panel and, in addition, commonly connects the input bumpers of the drive integrated circuit and the dummy input bumpers so as to make the signal line of the COF below about 10Ω. Accordingly, the liquid crystal display for a mobile phone driven by the line inversion driving method according to the present invention can minimize the horizontal flicker generated at the liquid crystal display panel.

Although the present invention has been explained by the embodiments shown in the drawings described above, it should be understood to the person of ordinary skill in the art that the invention is not limited to the embodiments, but rather that various changes or modifications thereof are possible without departing from the spirit of the invention. Accordingly, the scope of the invention shall be determined only by the appended claims and their equivalents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display for a mobile phone, comprising:
    a liquid crystal display panel;
    a plurality of gate lines and data lines crossing each other;
    liquid crystal cells formed at each crossing of data lines and gate lines; and
    a driver supplying a data signal to the data lines, said driver supplying a gate signal to each of adjacent gate lines in a different direction from each other; and
    a plurality of signal lines, each signal line commonly connected to interface pads and to input bumpers of the driver,
    wherein the liquid crystal display panel is driven by a line inversion method.

2. The liquid crystal display for a mobile phone according to claim 1, wherein the liquid crystal display panel includes:
    a first signal line formed on one side of the liquid crystal display panel to be connected to an odd-numbered gate line;
    a second signal line formed on the other side of the liquid crystal display panel to be connected to an even-numbered gate line; and
    a third signal line connected to the data line.

3. The liquid crystal display for a mobile phone according to claim 2, wherein the driver includes:
    a film adhered to the liquid crystal display panel;
    a data drive circuit mounted on the film for supplying a data signal to the third signal line; and
    a gate drive circuit mounted on the film for supplying a gate signal to the first and second signal lines.

4. The liquid crystal display for a mobile phone according to claim 1, wherein a distance between a pixel electrode of a liquid crystal cell and a pixel electrode of an adjacent liquid crystal cell is approximately 0.7 µm.

5. A liquid crystal display for a mobile phone comprising:
    a liquid crystal display panel;
    a plurality of gate lines and data lines crossing each other;
    liquid crystal cells formed at each crossing of data lines and gate lines;
    a driver supplying a data signal to the data lines, said driver supplying a gate signal to each of adjacent gate lines in a different direction from each other; and
    signal lines, each signal line commonly connected to interface pads and to input bumpers of the driver.

6. The liquid crystal display for a mobile phone according to claim 5, wherein a resistance of the signal line is below about $10\Omega$.

7. A method of driving a liquid crystal display (LCD) device having crossing gate lines and data lines, comprising:
    supplying data signals to data lines and gate signals to gate lines from the same driver;
    supplying said gate signals to said gate lines such that gate signals of adjacent gate lines have opposite directions; and
    supplying signal lines, each signal line commonly connected to interface pads and to input bumpers of the driver,
    wherein the liquid crystal display panel is driven by a line inversion method.

8. A method of manufacturing a liquid crystal display (LCD) panel, comprising:
    forming gate lines and data lines over a substrate, said gate lines and data lines crossing each other to form liquid crystal display cells;
    forming pixel electrodes in region bounded by crossing data lines and gate lines,
    forming a first signal line on one side of the liquid crystal display panel to be connected to an odd-numbered gate line;
    forming a second signal line on the other side of the liquid crystal display panel to be connected to an even-numbered gate line; and
    forming a third signal line connected to the data line,
    forming a chip on film (COF) signal line, each signal line commonly connected to interface pads and to input bumpers of a driver; and
    wherein the liquid crystal display is driven by a line inversion method.

9. The method of manufacturing a liquid crystal display (LCD) panel of claim 8, wherein a resistance of the signal lines is below about $10\Omega$.

* * * * *